Figure 1:
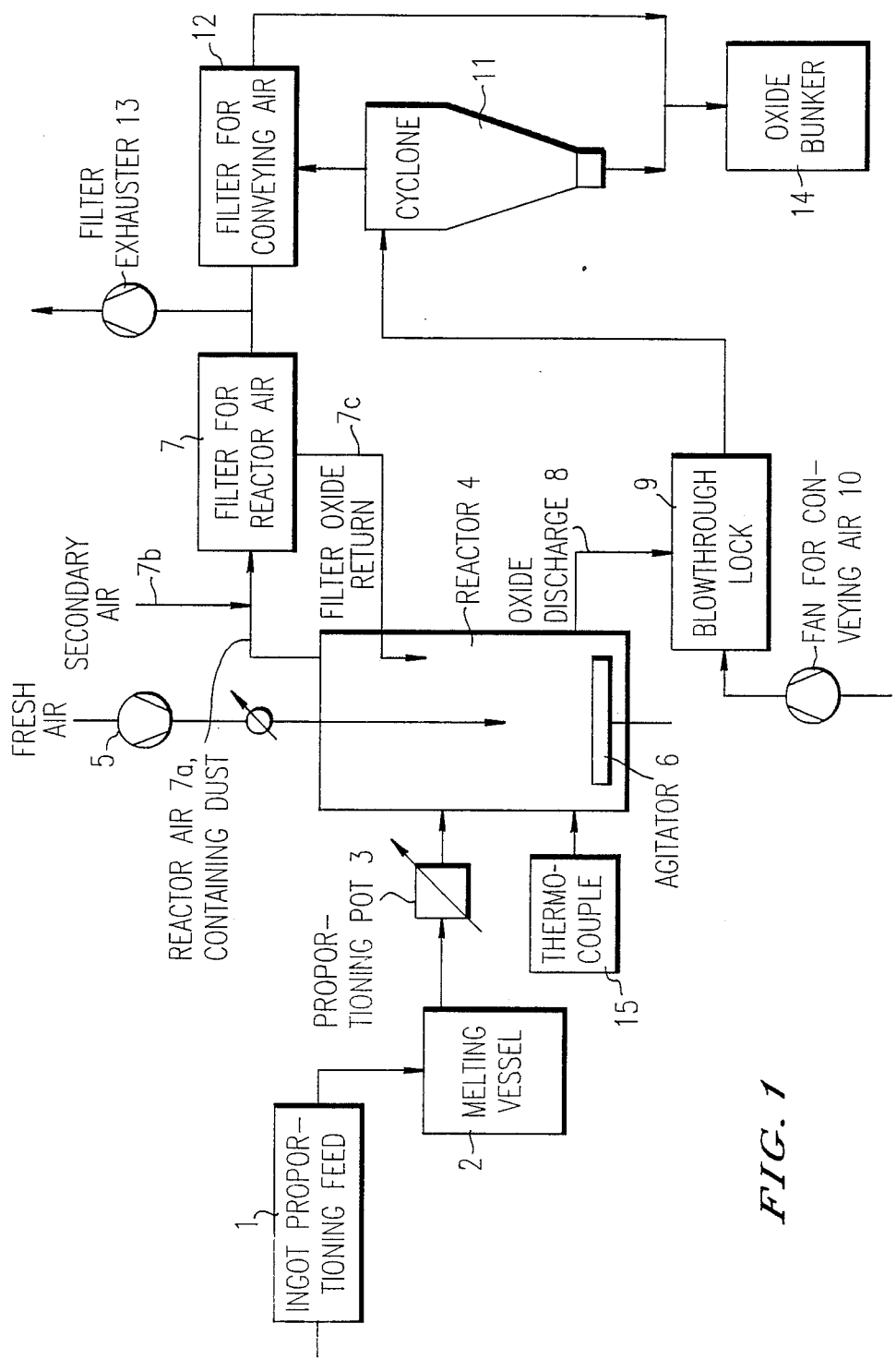

United States Patent [19]

Marx

[11] Patent Number: 4,975,268
[45] Date of Patent: Dec. 4, 1990

[54] METHOD FOR FINISH BURNING OF LITHARGE

[75] Inventor: Reinhard Marx, Bad Harzburg, Fed. Rep. of Germany

[73] Assignee: Heubach & Lindgens GmbH & Co. KG, Fed. Rep. of Germany

[21] Appl. No.: 399,940

[22] Filed: Aug. 29, 1989

[30] Foreign Application Priority Data

Aug. 31, 1988 [DE] Fed. Rep. of Germany ....... 3829534

[51] Int. Cl.$^5$ .............................................. C01G 21/02
[52] U.S. Cl. .................................................... 423/621
[58] Field of Search ................................ 423/619, 621

[56] References Cited

U.S. PATENT DOCUMENTS

| | | |
|---|---|---|
| 1,204,537 | 11/1916 | Barthelmess ......................... 423/621 |
| 1,913,391 | 6/1933 | Hutchinson .......................... 423/621 |
| 2,380,096 | 7/1945 | Doan et al. ........................... 423/621 |
| 2,383,220 | 8/1945 | Seabury et al. ...................... 423/621 |
| 3,322,496 | 5/1967 | Vahrenkamp et al. ................. 75/77 |
| 4,108,634 | 8/1978 | Rahn et al. ........................... 423/619 |
| 4,521,399 | 6/1985 | McKinney ........................... 423/621 |
| 4,536,385 | 8/1985 | Heubach et al. ..................... 423/621 |

FOREIGN PATENT DOCUMENTS

| | | |
|---|---|---|
| 0039478 | 4/1981 | European Pat. Off. . |
| 152220 | 8/1984 | Japan ................................... 423/621 |
| 220823 | 8/1924 | United Kingdom ................ 423/621 |

Primary Examiner—Wayne A. Langel
Attorney, Agent, or Firm—Venable, Baetjer, Howard & Civiletti

[57] ABSTRACT

The method according to the invention for producing industrial litharge of more than 99.98, preferably more than 99.99, % by weight oxide content, wherein liquid lead in heated form is introduced into a reactor in an amount which is constant and uniform in time average, the reaction temperature is set to a temperature in the range from more than 500° C. to 680° C. and the crude oxide having an oxidation degree of about 99.7% thus obtained is further oxidized, is characterized in that in the first stage in the production of the crude oxide with an oxidation degree of about 99.7% the product discharged with the reaction air is filtered out of the latter and returned to the reactor and, when enough oxide has collected in the reactor, the lead supply and the filter oxide return are interrupted and only air is then blown in, and the charge oxidized to a residual content of metallic lead of at the most 0.01% is not completely discharged but only to an extent of about 50%.

12 Claims, 2 Drawing Sheets

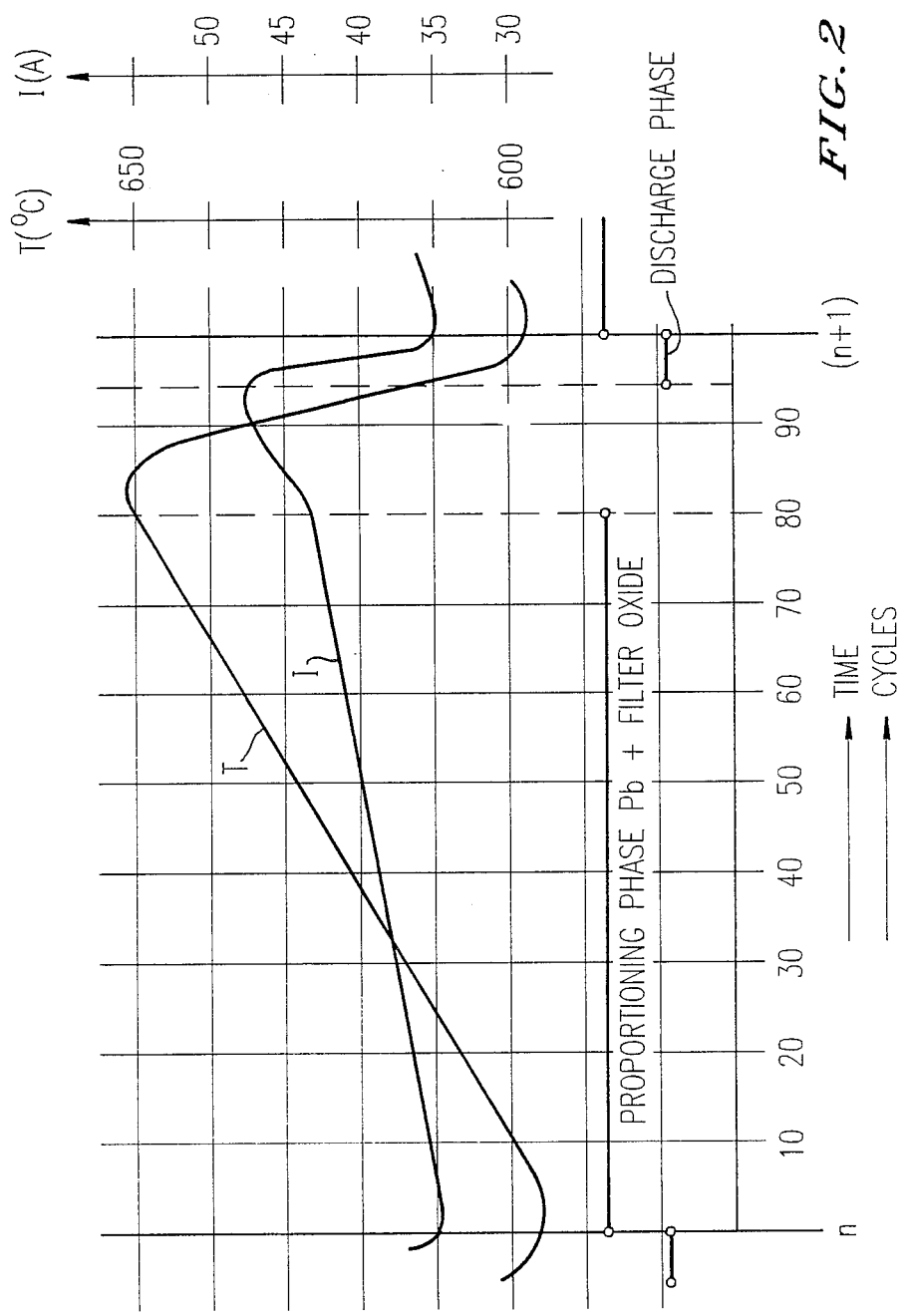

METHOD FOR FINISH BURNING OF LITHARGE

In the past, the production of commercial lead oxide, known as litharge (PbO), involved at least two process steps:
1. preoxidation of the metallic lead in a reactor with agitator and
2. finish burning of the crude oxide in a second kiln.

The reason for the separation into two steps was that the finish oxidation took a disproportionately longer time than the preoxidation so that a second externally-heated unit was necessary. The preoxidation in the reactor with agitator, on the other hand, required no added thermal energy because the oxidation heat of the lead is able to keep the process at the reaction temperature.

To eliminate this disadvantage, in DE-AS 1,467,347 a singlestage method for producing industrial litharge has already been developed in which an air stream is conducted into the reaction vessel and molten lead is supplied in a continuous flow to the vessel at a rate such that the contents of the vessel are kept at an average temperature of at least the melting temperature of the metallic lead and, by introducing the air stream into the lower portion of the vessel at any instant of the method, a foam of particles of metallic lead and litharge is maintained in the vessel and the contents of the vessel are vigorously moved by spraying in a manner known per se onto a large stationary barrier disc in such a way that the vessel is kept free from any larger accumulation of molten lead. The product discharged with the reaction air is partially filtered out and returned to the reactor, the cyclone representing the filter for the larger and heavier particles. However, with this method only litharge with at the most 99.04% PbO is obtained. An improvement as regards the PbO content is obtained with a further single-stage method; in this case liquid lead is introduced with air into a litharge reactor, the lead supply being constant and uniform in time average and the reaction temperature being set, for example, to the range from more than 500° C. to 640° C. To prevent the predetermined reaction temperature from fluctuating more than ± approximately 5° C. the air stream is changed slightly when required. This single-stage method for producing litharge is described in DE-OS 3,016,984 and EP-A 0039478 and yields a crude oxide with an oxidation degree of 99.7 to 99.8%. The bed of the product is intensively moved by an agitator.

However, it is frequently necessary to have a higher oxidation degree, and consequently the crude oxide produced in this way with 99.7 to 99.8% PbO content has to be "finish oxidized".

This would again involve a two-stage method with all the disadvantages known from the earlier prior art, i.e. a time consumption of several hours for the finish oxidation, f.i. about 2 hours as a rough guide for litharge, a complex burning unit and a fuel consumption of about 200.000 kcal/t litharge, as well as a considerable electrical power consumption for various drives.

Even with the aforementioned single-stage method according to DE-OS 3,016,984 and EP-A 0 039 487 it was not possible to exceed a lead oxide content of 99.8%.

It has now surprisingly been found that the method of the cited DE-PS and EP-PS can be still further improved if the oxidation of the metallic lead is modified in such a way that, using a known agitator for example of the type "Barton" or "HEUBACH", the process is carried out in cycles. Thus, various parameters are deliberately not kept constant but, in deviation from DE-AS 3,016,984 and EP-A 0 039 478, are varied in accordance with the particular desired and necessary scheme in constantly recurring cycles:

In detail, the procedure adopted is as follows:
1. Liquid lead is introduced in dosed amounts into the reactor held at reaction temperature, as was hitherto also the case.
2. The oxidation air simultaneously blown in is withdrawn and filtered, and the entrained filtered-out oxide is returned to the reactor.
3. When a predetermined charging degree of the reactor vessel is reached, both the lead proportioning and the afore-mentioned return of the filter oxide are interrupted and the finish oxidation starts.
4. When the finish oxidation is completed the product is withdrawn from the bottom of the reactor via a suitable discharge unit; however, a predetermined residual amount must remain in the reactor to enable the cycle to start again from the beginning.

Thus, the previously known method of one-stage oxidation is modified above all in two points:
oxide entrained with the air is returned; and
the finished product is not completely discharged but only about half thereof, and this is done mechanically and not pneumatically (i.e. downwards and not upwards).

Preferably, the agitation is also performed from below because this makes it technically easier to employ a fairly rapidly running stirrer or agitator with angled stirrer blades and this gives a more intensive mixing and thus better distribution of oxygen in the bulk material.

Otherwise, all the process parameters can be regulated in the accustomed manner. The reaction temperature is of particular importance and for its control, apart from the otherwise usual changing of the lead or air proportioning, it is also advantageous to inject water if a certain amount of cooling is desired. However, on the whole the process step of preoxidation must be carried out in such a manner that an oxidation degree of far above 99% is achieved, preferably 99.7 to 99.8%, as is possible according to the aforementioned DE-AS and EP-A, because otherwise the second step cannot be carried out successfully.

It is possible in this manner to again substantially increase the PbO content of 99.7 to 99.8 achievable in one stage, i.e. to at least 99.99%; although the operation appears to consist of two stages again, the entire process can be carried out successfully in the manner outlined in a short time, because the finish oxidation which otherwise takes hours in the two-stage process is effected in a few minutes and consequently no added thermal energy need be supplied, in particular if the reactor is well insulated. The through-put power of a reactor generating a finished oxide instead of a crude oxide is admittedly somewhat smaller, but this slight disadvantage is in no way comparable with the expenditure which would otherwise have to be made for a genuine second following process stage.

Application of the above principles in the production of litharge yields the surprising result that the finish burning in a reactor of standard size is possible in about 3 minutes. On the basis of this knowledge, a single-stage litharge process has been developed which utilizes the same unit for finish burning as for the preoxidation. In the reactor, a crude oxide with an oxidation degree of about 99.7% is generated initially in accordance with DE-AS 3,016,984 and EP-A 0039478; however, in modification of the method described in the cited patent specifications the product discharged with the reaction air is filtered out of the latter and returned to the reactor. As soon as enough crude oxide has accumulated in the reactor, the lead supply and filter oxide return are interrupted and only air is then blown in: within a few minutes the charge is then oxidized except for a residual content of metallic lead of 0,01%. The temperature drops only slightly and to a perfectly acceptable extent. The finished product is thereafter partially discharged via a discharge lock at the bottom of the reactor; a residual amount remains in the reactor because only in this way is it possible to satisfactorily start the next cycle for generating crude oxide. The amount which should suitable be left in the reactor is about half, but this amount may also be somewhat higher. The term "enough crude oxide" which has collected in the reactor means an amount which can still be easily moved by the agitator or stirrer and this of course depends on the type of agitator and the form of the reactor. The temperature drop in the finish oxidation is on the average less than 50° and with good process conduction even only about 20° C.

A complete cycle requires about 80% of the time for producing crude oxide and 20% for the finish oxidation including the discharge. With a finish burning time of about 3 min this means a total time of about 15 min to 20 min (if a discharge time of about 1-2 min is added, to the finish burning time of 3 minutes).

In the attached drawings the method apparatus is shown in FIG. 1 and the course of the method is shown in schematic form in FIG. 2.

In the agitating reactor 4 with the agitator drive 6 the lead is supplied via the proportioning pot 3, whereby said supply means can also be a nozzle operating according to EP-A 0039478 or DE-AS 3,016,984. Via the conduit 5 the primary air is supplied and via the conduit 7a, the filter 7 and the exit air exhauster 13 the air is extracted; secondary air can enter via a conduit 7b opening into 7a and the oxide leaving with the exit air is retained via the filter 7 and is returned via the conduit 7c to the reactor. Oxygen can also be supplied via the conduit 5 to amplify or replace the air supply in the subsequent oxidation. The finished product is discharged via 8 and preferably 11 when it has reached the adequate degree of oxidation. Thus, at 8 the finished oxide is mechanically withdrawn and can then either be discharged directly or preferably blown via the blow-through lock 9 into the cyclone 11 where, if desired, coarse components, for example particles greater than 100 μm, can be separated. This separation can of course also take place in the further transport from the oxide bunker 14. At 4 the reaction temperature is measured and controlled via a thermocouple 15. This control is of course also used in combination with the analysis of the reaction product for the proportioned addition of lead, primary air, oxygen and water and also controls the discharge of the reaction product, preferably via the current consumption of the agitator drive 2.

As mentioned, the reaction product is not completely discharged but at the most only half thereof in order to facilitate the finish oxidation of the next charge. This remaining charge left in the reactor can be up to $\frac{2}{3}$. The expression "half" and "$\frac{2}{3}$" always relates, as customery in this field of the art, to agitator capacity and not to the reactor volume.

The following working example will illustrate the process of litharge production:

In a circular reactor of, say, 800 mm diameter filled to 65% of the agitator capacity with lead oxide and heated to 590° C., lead and air are uniformly metered in, for example 230 kg Pb/h and 150 m³ air/h In the course of about 25 min the reactor fills to such an extent that the capacity of the agitator is exhausted and the temperature rises to 650° C. At this point the lead supply and the return of the filter oxide are interrupted and the process step of finish oxidation begins. For the duration of 3-4 min the reactor contents are stirred whilst only air is supplied and thereafter an amount of about 100 kg is discharged from the reactor via a special discharge unit, this taking a further 2 min. The temperature drops during the finish oxidation and the discharge by about 50° C.; after conclusion of the two process steps the initial state is reached again and the next cycle starts, in that the lead metering is switched on again and the filter oxide is also introduced again.

The temperature drop can be reduced by good insulation of the reactor, but a temperature drop of up to 50° C. is admissible.

Expressed as a percentage, the preoxidation takes up about 80% of the total time so that the discharge of this small reactor is about 200 kg of lead oxide per hour. The oxide generated is free from $PbO_2$ and has a residual amount of free lead far less than 0,01%. It thus meets all requirements for commercial lead litharge.

The diagram in FIG. 2 illustrates a working cycle in detail.

The diagram in FIG. 2 shows the temperature curve and current requirement of the agitator of the litharge reactor during a working cycle. The curve marked T shows in the rising portion the temperature increase during the proportioning phase, i.e. during the phase in which lead is introduced in proportioned amount into the reactor and oxidized to lead litharge. In the declining portion, said curve shows the phase of finish oxidation and discharge, these phases being indicated as a percentage of the total time because the absolute time depends of course on several factors, in particular however on the size of the reactor.

Curve I shows the current consumption in amps of the drive motor of the reactor during the working cycle. It is seen that this quantity which is proportional to the agitator energy, first rises rapidly for the finish oxidation and then of course drops rapidly in the discharge phase because the agitator is then relieved. On the left ordinate, marked n, the discharge phase of the preceding cycle is indicated on the left, whilst on the right ordinate marked by n+1, the next proportioning phase is shown. The same applies to the temperature variation and energy variation of the curves T and I.

This working in cycles thus permits virtually singlestage production of litharge of more than 99.99% purity, which was hitherto only possible in two stages by crude oxidation and subsequent separate oxidation.

I claim:

1. A method for producing industrial litharge of more than 99.98% by weight oxide content, wherein liquid lead in heated form is introduced into a reactor equipped with an agitator in an amount which is constant and uniform in time average, the reaction temperature is set to a temperature in the range of greater than 500° C. to no more than 680° C. and the crude oxide having an oxidation degree of about 99.7% thus obtained is further oxidized, characterized in that in the first stage in the production of the crude oxide with an oxidation degree of about 99.7% the product discharged with the reaction air is filtered out of the latter and returned to the reactor and, before the oxide collected in the reactor exceeds that which can be easily moved by the agitator, the lead supply and filter oxide return are interrupted and only air is then blown in and the charge oxidized to a residual content of metallic lead of at the most 0.02% is not completely discharged but only to and extent of about 50%.

2. The method of claim 1 wherein in a working cycle the first part for producing the crude oxide takes about 80% of the total time used and the finish oxidation including the discharge takes about 20% of the total time used.

3. The method of claim 1 or claim 2 wherein in the litharge reactor the product is held in suspension by an intensive agitator.

4. The method of claim 1 or claim 2 wherein the finished product is discharged in controlled cycles and proportions of the total charge at the bottom of the reactor.

5. The method of claim 3 wherein the action of the agitator is such as to create a suspension which simulates that obtained in a fluidized bed.

6. The method of claim 3 wherein the finished product is discharged in controlled cycles and proportions of the total charge at the bottom of the reactor.

7. The method of claim 1 or claim 2 wherein the industrial litharge obtained has an oxide content of more than 99.99 percent by weight.

8. A continuous process for the production of very high purity industrial litharge comprising
  (a) introducing liquid lead at a uniform rate into a reactor equipped with an agitator and oxidizing it at a reaction temperature greater than about 500° C. and up to about ° C. to yield a crude oxide with an oxidation degree of approximately 99.7%,
  (b) separating entrained crude oxide from the reaction gas discharge, and returning it to the reactor,
  (c) interrupting the feed of liquid lead and the return of entrained crude oxide before the oxide collected in the reactor can no longer be easily moved by the agitator, then
  (d) further oxidizing the crude oxide in the reactor until it has an oxide content of at least about 99.98 weight percent, and then
  (e) discharging not more than about 50 percent of the reactor capacity, determined in terms of the capacity of the agitator.

9. The process of claim 8 wherein the finished oxide is discharged from the bottom of the reactor.

10. The process of claim 9 wherein in a working cycle the production of the crude oxide consumes approximately 80 percent of the total cycle time.

11. The process of claim 8 or claim 9 or claim 10 wherein the reactor has an intensive agitator which maintains the oxide in the reactor in a suspension which simulates that obtained in a fluidized bed.

12. The process of claim 8 or claim 9 wherein the feed of liquid lead and return of entrained oxide is interrupted when the amount of oxide collected in the reactor approaches or reaches the capacity of the agitator.

* * * * *